United States Patent
Erb et al.

(10) Patent No.: US 9,279,598 B2
(45) Date of Patent: Mar. 8, 2016

(54) SYSTEM AND METHOD FOR FORMING AN ENERGY EXCHANGE ASSEMBLY

(71) Applicant: VENMAR CES, INC, Saskatoon (CA)

(72) Inventors: Blake Norman Erb, Warman (CA);
Stephen Hanson, Saskatoon (CA);
Mohammad Afshin, Saskatoon (CA);
Kenneth Paul Coutu, Saskatoon (CA)

(73) Assignee: Nortek Air Solutions Canada, Inc., Saskatoon, SK (CA)

( * ) Notice: Subject to any disclaimer, the term of this patent is extended or adjusted under 35 U.S.C. 154(b) by 185 days.

(21) Appl. No.: 14/190,754

(22) Filed: Feb. 26, 2014

(65) Prior Publication Data
US 2014/0264968 A1 Sep. 18, 2014

Related U.S. Application Data

(60) Provisional application No. 61/793,984, filed on Mar. 15, 2013.

(51) Int. Cl.
| | |
|---|---|
| F28C 3/02 | (2006.01) |
| F24F 13/00 | (2006.01) |
| F24F 12/00 | (2006.01) |
| F28D 9/00 | (2006.01) |
| F28D 21/00 | (2006.01) |

(52) U.S. Cl.
CPC ............... *F24F 13/00* (2013.01); *F24F 12/006* (2013.01); *F28C 3/02* (2013.01); *F28D 9/0062* (2013.01); *F28D 21/0008* (2013.01); *F28D 21/0015* (2013.01); *Y02B 30/563* (2013.01); *Y10T 29/49826* (2015.01)

(58) Field of Classification Search
CPC ...................................... B01F 3/04; F28C 3/02
USPC ................. 261/100, 152; 454/228, 230; 96/7; 165/4, 10
See application file for complete search history.

(56) References Cited

U.S. PATENT DOCUMENTS

| | | | | |
|---|---|---|---|---|
| 4,449,992 A | * | 5/1984 | Yamada | ............... F28D 21/0015 96/7 |
| 8,157,891 B2 | | 4/2012 | Montie | |
| 2014/0014289 A1 | * | 1/2014 | Tan | ....................... F28D 9/0025 165/10 |

* cited by examiner

*Primary Examiner* — Robert A Hopkins
(74) *Attorney, Agent, or Firm* — Joseph M. Butscher; The Small Patent Law Group, LLC

(57) ABSTRACT

A method of forming an energy exchange assembly may include forming a plurality of creases and a plurality of slits in a membrane sheet according to a predefined pattern, positioning a first spacer on top of a first forming area of the membrane sheet, folding the membrane sheet over a top of the first spacer so that a second forming area is positioned over the top of the first spacer, sealing a first portion of the first forming area to a first outer lateral wall of the first spacer, and positioning a second spacer on top of the second forming area, thereby stacking the second spacer over the first spacer.

20 Claims, 8 Drawing Sheets

SYSTEM AND METHOD FOR FORMING AN ENERGY EXCHANGE ASSEMBLY

CROSS-REFERENCE TO RELATED APPLICATIONS

The present application relates to and claims priority benefits from U.S. Provisional Patent Application No. 61/793,984, entitled "Continuous Membrane Wrapping for an Energy Recovery Core," filed Mar. 15, 2013, which is hereby expressly incorporated by reference in its entirety.

BACKGROUND OF THE DISCLOSURE

Embodiments of the present disclosure generally relate to an energy exchange assembly, such as an energy recovery core, and, more particularly, to a system and method of forming an energy exchange assembly.

Energy exchange assemblies are used to transfer energy, such as sensible and/or latent energy, between fluid streams. For example, air-to-air energy recovery cores are used in heating, ventilation, and air conditioning (HVAC) applications to transfer heat (sensible energy) and moisture (latent energy) between two airstreams. A typical energy recovery core is configured to precondition outdoor air to a desired condition through the use of air that is exhausted out of the building. For example, outside or supply air is channeled through the energy recovery core in proximity to exhaust air. Energy between the supply and exhaust air streams is transferred therebetween. In the winter, for example, cool and dry outside air is warmed and humidified through energy transfer with the warm and moist exhaust air. As such, the sensible and latent energy of the outside air is increased, while the sensible and latent energy of the exhaust air is decreased. The energy recovery core typically reduces post-conditioning of the supply air before it enters the building, thereby reducing overall energy use of the system.

Air-to-air recovery cores may include a membrane through which heat and moisture are transferred between air streams. The membrane may be separated from adjacent membranes using a spacer. In an energy recovery core, the amount of heat transferred is generally determined by a temperature difference and convective heat transfer coefficient of the two air streams, as well as the material properties of the membrane. The amount of moisture transferred in the core is generally governed by a humidity difference and convective mass transfer coefficients of the two air streams, but also depends on the material properties of the membrane.

The design and assembly of the energy recovery core may also affect the heat and moisture transfer between air streams, which impacts the performance and cost of the energy core. For example, if the membrane does not properly adhere to the spacer, an increase in air leakage and pressure drop may occur, thereby decreasing the performance (measured as latent effectiveness) of the energy recovery core. Conversely, if excessive adhesive is used to secure the membrane to the spacer, the area available for heat and moisture transfer may be reduced, thereby limiting or otherwise reducing the performance of the energy recovery core. Moreover, the use of adhesives in relation to the membrane also adds additional cost and labor during assembly of the core.

A known method of assembling an energy recovery core includes gluing a membrane to an air spacer and then stacking layers of membrane and spacer to a desired height. As one example, the membrane may be cut into sheets the same size as the air spacer, then glued to the air spacer with dots of glue along peaks of a sinusoidal-shaped body of the air spacer. When the membrane is pressed onto the air spacer the glue spreads out along the membrane surface, thereby reducing the area of membrane that is available for energy transfer. In another example, the membrane is cut into sheets the same width as the air spacer, but longer in the length-wise direction than the air spacer. The sheets are then wrapped around the edge of the spacer and glued into place. The area of the membrane where the glue is applied is then blocked off, thereby preventing moisture transfer.

Another known method of assembling an energy recovery core includes using two rolls of membrane material. Each membrane roll has a width that is half a diagonal length of an air spacer. Each membrane roll is wrapped around the air spacer in opposite directions. The rolls are then wrapped diagonally around the air spacer and the process is continued until the stack has reached a desired height. During this process, a seam is created down the middle of each layer, which is then taped at the seam. However, the tape reduces the area of membrane available for heat and moisture transfer.

SUMMARY OF THE DISCLOSURE

Certain embodiments of the present disclosure provide a method of forming an energy exchange assembly that may include forming a plurality of creases and a plurality of slits in a membrane sheet according to a predefined pattern, positioning a first spacer on top of a first forming area of the membrane sheet, folding the membrane sheet over a top of the first spacer so that a second forming area is positioned over the top of the first spacer, sealing a first portion of the first forming area to a first outer lateral wall of the first spacer, and positioning a second spacer on top of the second forming area. The positioning the second spacer operation stacks the second spacer over the first spacer. The method may also include repeating the positioning, folding, and sealing operations with respect to additional spacers and additional forming areas. The membrane sheet may be a single roll of material.

The method may also include folding the membrane sheet over a top of the second spacer so that a third forming area is positioned over the second spacer. A fourth forming area may be positioned over the third forming area. In at least one embodiment, the method may also include unfolding the fourth forming area away from the third forming area. The method may also include sealing a second portion of the third forming area to a second outer lateral wall of the second spacer. The sealing operation may occur only at a lateral wall of the spacers, for example.

The membrane sheet may be devoid of one or both of a seam or sealing agent on or within an energy transfer surface. The membrane sheet may be devoid of one or both of a seam or sealing agent above or below each of the first and second spacers.

Certain embodiments of the present disclosure provide an energy exchange assembly that may include a membrane sheet including a plurality of creases and a plurality of slits. A first spacer is positioned on top of a first forming area of the membrane sheet. The membrane sheet is folded over a top of the first spacer so that a second forming area is positioned over the top of the first spacer. A first portion of the first forming area is sealed to a first outer lateral wall of the first spacer. A second spacer is positioned on top of the second forming area. The second spacer is stacked over the first spacer.

Certain embodiments of the present disclosure provide an energy exchange system that may include a supply air flow path configured to channel supply air to an enclosed structure, a regeneration air flow path configured to channel regeneration air from the enclosed structure to an outside environment, and an energy exchange assembly disposed within the supply air flow path and the regeneration air flow path. The energy exchange assembly may include a membrane sheet including a plurality of creases and a plurality of slits, a first spacer positioned on top of a first forming area of the membrane sheet. The membrane sheet is folded over a top of the first spacer so that a second forming area is positioned over the top of the first spacer. A first portion of the first forming area is sealed to a first outer lateral wall of the first spacer. A second spacer is positioned on top of the second forming area, such that the second spacer is stacked over the first spacer.

Figure 1:
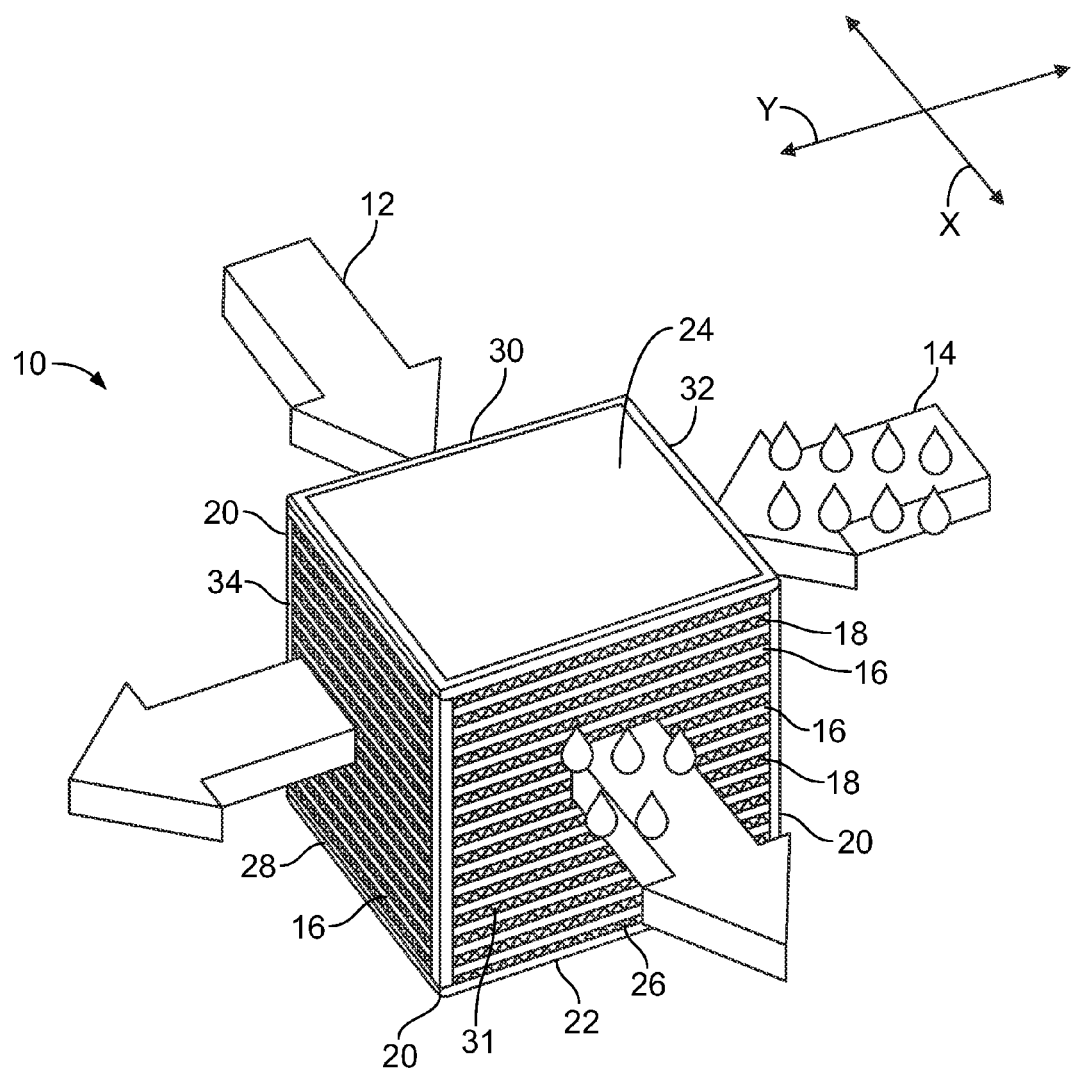
FIG. 1 illustrates a perspective top view of an energy exchange assembly, according to an embodiment of the present disclosure.

Before the embodiments are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 illustrates a perspective top view of an energy exchange assembly 10, according to an embodiment of the present disclosure. The energy exchange assembly 10 may be an energy recovery core, a plate heat exchanger, or the like configured to transfer energy between fluid streams, such as first and second air streams 12 and 14. As such, the energy exchange assembly 10 may be an air-to-air energy recovery core assembly.

The energy exchange assembly 10 may include a plurality of membranes 16 separated by spacers 18. The membranes 16 may be formed of a microporous material that is configured to allow sensible and latent energy to pass therebetween. For example, the membranes 16 may be formed of polypropylene, ethylene tetrafluoroethylene (ETFE), or the like. The spacers 18 may be formed of plastic, metal, or the like. For example, the spacers 18 may be formed of corrugated plastic. By stacking the membranes 16 and the spacers 18, channels are formed that allow the first and second air streams 12 and 14 to pass through the energy exchange assembly 10.

The energy exchange assembly 10 may be oriented so that the first air stream 12 may be outside air that is to be conditioned, while the second air stream 14 may be exhaust, return, or scavenger air that is used to condition the outside air before the outside air is supplied to downstream HVAC equipment and/or an enclosed space as supply air. Heat and moisture may be transferred between the first and second air streams 12 and 14 through the membranes 16.

The membranes 16 may be secured between outer upstanding brackets 20, a base 22, and a top wall 24. As shown, the brackets 20 may generally be at the corners of the energy exchange assembly 10. The base 22, the top wall 24, and the brackets 20 provide a main housing defining an internal chamber into which the membranes 16 and the spacers 18 are secured. Alternatively, the energy exchange assembly 10 may not include the brackets 20, the base 22, and the top wall 24. Instead, the energy exchange assembly 10 may be formed by folding portions of a membrane sheet over spacers, thereby forming membranes, as described below.

The membranes 16 may alternate between levels 26 and 28. Each of the levels 26 and 28 may include a fluid channel defined between opposed membranes that are separated by a spacer, for example. The levels 26 are oriented parallel with an axis x, while the levels 28 are oriented parallel with an axis y, which is perpendicular (or oriented at an acute angle) to the axis x. Thus, the levels 26 are oriented to receive the first air stream 12 at an inlet side 30 and direct the first air stream 12 to an outlet side 31, while the levels 28 are oriented to receive and second air stream 14 at an inlet side 32, which is perpendicular to the inlet side 30, and direct the second air stream 14 to an outlet side 34, which is perpendicular to the outlet side 31. Therefore, the air stream 12, passing through the levels 26, travels in a cross-flow direction with the air stream 14 passing through the levels 28. In this manner, sensible and/or latent energy may be exchanged between the levels 26 and 28.

For example, as shown in FIG. 1, the first air stream 12 may enter the inlet side 30 as cool, dry air. As the first air stream 12 passes through the energy exchange assembly 10, the temperature and humidity of the first stream are both increased through energy transfer with the second air stream 14 that enters the energy exchange assembly 10 through the inlet side 32 as warm, moist air. Accordingly, the first air stream 12 passes out of the outlet side 31 as warmer, moister air (as compared to the first air stream 12 before passing into the inlet side 30), while the second air stream 14 passes out of the outlet side 34 as cooler, drier air (as compared to the second air stream 14 before passing into the inlet side 32). In general, the temperature and humidity of the first and second air streams 12 and 14 passing through the levels 26 and 28 tends to equilibrate with one another. For example, warm, moist air within the levels 28 is cooled and dried by heat exchange with the cooler, drier air in the levels 26, while cool, dry air within the levels 26 is warmed and moistened by the warmer, cooler air within the levels 28. Air that passes into the levels 28 is cooler and drier after passing through the energy exchange assembly 10. Conversely, air that passes into the levels 26 is warmer and moister after passing through the energy exchange assembly 10.

Figure 2:
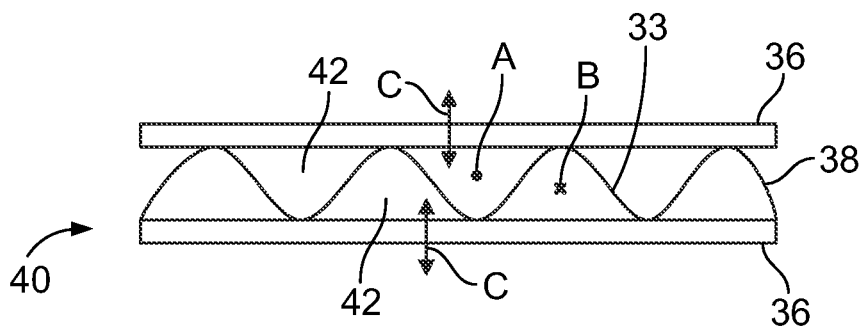
FIG. 2 illustrates an end view of membranes separated by a spacer, according to an embodiment of the present disclosure.

FIG. 2 illustrates an end view of membranes 36 separated by a spacer 38, according to an embodiment of the present disclosure. The membranes 36 and the spacer 38 may define a level 40 having fluid channels 42 formed therethrough. As shown, the spacer 38 may be a corrugated sheet of material, such as plastic, having a curved, undulating, sinusoidal, or the like shape. The spacer 38 is shown having multiple arched portions 33. The spacer 38 may include more or less arched portions 33 than shown. For example, the spacer 38 may include a single arched portion that spans between the membranes 36.

Air flow is configured to flow in the directions of A and B through the fluid channels 42 between the membranes 36. Sensible and latent energy may be transferred to or from the air flow in the direction of arrows C through the membranes 36.

Figure 3:
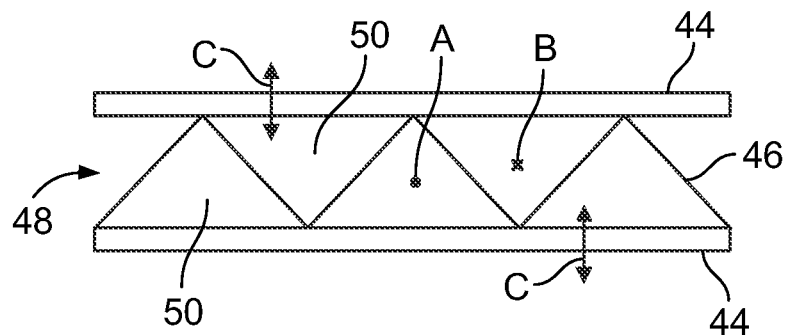
FIG. 3 illustrates an end view of membranes separated by a spacer, according to an embodiment of the present disclosure.

FIG. 3 illustrates an end view of membranes 44 separated by a spacer 46, according to an embodiment of the present disclosure. The membranes 44 and the spacer 46 may define a level 48 having fluid channels 50 formed therethrough. As shown, the spacer 46 may be a corrugated sheet of material, such as plastic, having a triangular, ribbed, sawtooth, angled, or the like shape.

Figure 4:
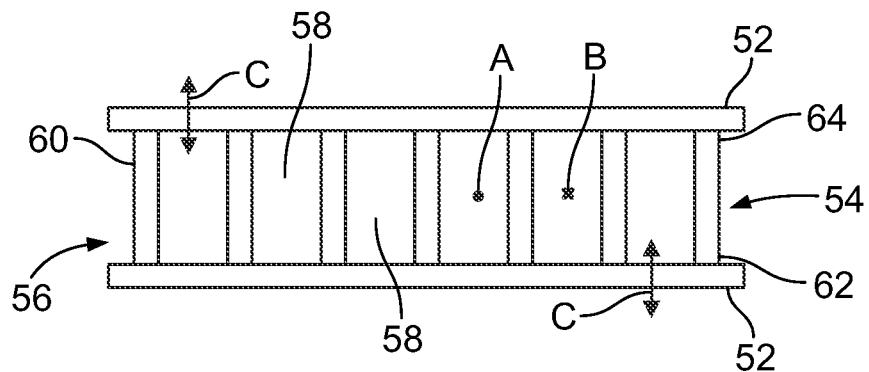
FIG. 4 illustrates an end view of membranes separated by a spacer, according to an embodiment of the present disclosure.

FIG. 4 illustrates an end view of membranes 52 separated by a spacer 54, according to an embodiment of the present disclosure. The membranes 52 and the spacer 54 may define a level 56 having fluid channels 58 formed therethrough. As shown, the spacer 54 may include a plurality of upstanding parallel walls 60 connected to lower and upper support plates 62 and 64, respectively.

FIGS. 2-4 illustrates examples of membranes separated by spacers. It is to be understood that various other spacers having different sizes and shapes may be used.

Figure 5:
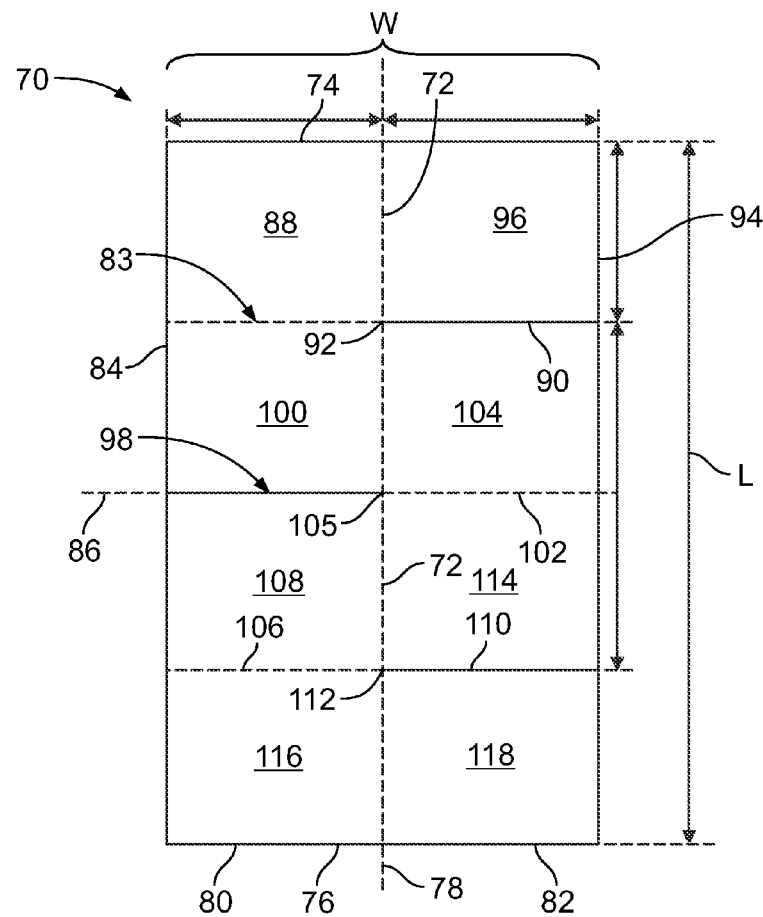
FIG. 5 illustrates a top plan view of an unwrapped membrane sheet, according to an embodiment of the present disclosure.

FIG. 5 illustrates a top plan view of an unwrapped membrane sheet 70, according to an embodiment of the present disclosure. The membrane sheet 70 may be formed of a planar sheet of membrane material. A width W of the unwrapped membrane sheet 70 may be greater than a width of an energy exchange assembly, such as an energy recover core, that is to be formed and assembled. For example, the width W may be twice the width of an energy exchange assembly that is to be formed and assembled. A length of the unwrapped membrane sheet 70 may be scalable to achieve a desired height of the energy exchange assembly.

The unwrapped membrane sheet 70 may include a central longitudinal crease or fold line 72 that extends from an end edge 74 to an opposite end edge 76 along a central longitudinal axis 78 of the unwrapped membrane sheet 70. As such, the central longitudinal fold line 72 divides the unwrapped membrane sheet 70 into first and second longitudinal half portions 80 and 82.

A latitudinal crease or fold line 83 that is parallel with the end edge 74 is formed from a lateral edge 84 to the central longitudinal fold line 72 equidistant between the end edge 74 and a central latitudinal axis 86. A forming area 88 is defined between the end edge 74, the lateral edge 84, the longitudinal fold line 72, and the latitudinal fold line 83. The forming area 88 is configured to support a spacer and form a membrane surface area of a level, for example. Creases or folds may be formed in the membrane sheet 70 through various operations, such as crimping, bending, folding, or the like.

A slit 90 connects to an end 92 of the latitudinal fold line 83 at the longitudinal fold line 72 and extends to a lateral edge 94 that is parallel with and opposite from the lateral edge 84. The slit 90 is parallel with the end edge 74 and is equidistant between the end edge 74 and the central latitudinal axis 86. The slit 90 may be formed by cutting, scoring, perforating, or otherwise penetrating the material of the unwrapped membrane sheet 70. A forming area 96 is defined between the end edge 74, the lateral edge 94, the longitudinal fold line 72, and the slit 90.

A slit 98, which is parallel with the latitudinal fold line 83, is formed through the latitudinal axis 86 and extends from the lateral edge 84 to the longitudinal fold line 72. A forming area 100 is defined between the latitudinal fold line 83, the lateral edge 84, the longitudinal fold line 72, and the slit 98.

A latitudinal crease or fold line 102 that is parallel with the slit 90 is formed from an end 105 of the slit 90 at the central longitudinal fold line 72 to the lateral edge 94. A forming area 104 is defined between the slit 90, the longitudinal fold line 72, the latitudinal fold line 102, and the lateral edge 94.

A latitudinal crease or fold line 106 that is parallel with the slit 98 is equidistant between the latitudinal axis 86 and the end edge 76 and is formed from the lateral edge 84 to the central longitudinal fold line 72. A forming area 108 is defined between the slit 98, the lateral edge 84, the latitudinal fold line 106, and the longitudinal fold line 72.

A slit 110, which is parallel with the latitudinal fold line 102, is formed from an end 112 of the latitudinal fold line 106 at the longitudinal axis 72 to the lateral edge 94. A forming area 114 is defined between the latitudinal fold line 102, the longitudinal fold line 72, the lateral edge 94, and the slit 110.

A forming area 116 is defined between the latitudinal fold line 106, the lateral edge 84, the longitudinal fold line 72, and the end edge 76. A forming area 118 is defined between the slit 110, the longitudinal fold line 72, the lateral edge 94, and the end edge 76.

As shown, each of the forming areas 88, 96, 100, 104, 108, 114, 116, and 118 may be have the same dimensions. For example, each of the forming areas 88, 96, 100, 104, 108, 114, 116, and 118 may be squares having the same or similar area.

Further, the latitudinal fold lines and slits may alternate over a length of the unwrapped membrane sheet 70 on each half 80 and 82. For example, as shown in FIG. 5, the half 80 includes one slit 98 at the latitudinal axis 86, while the half 82 includes the fold line 102 at the latitudinal axis 86 with slits 90 and 110 equidistant between the end edges 74 and 76, respectively.

The slits are formed so as to allow open spaces for air to flow into and through spacers, as shown and described below. Thus, as the membrane sheet 70 is wrapped over itself, material does not block the inlets and outlets of the spacers.

While the unwrapped membrane sheet 70 is shown having eight forming areas 88, 96, 100, 104, 108, 114, 116, and 118, more or less forming areas may be formed. For example, the unwrapped membrane sheet 70 may include four, size, ten, or more forming areas.

The unwrapped membrane sheet 70 may be folded and slit as shown in FIG. 5 in order to be easily wrapped around spacers to form an energy exchange assembly, as described below. For example, in a 12"×12"×12" energy recovery core having 130 membrane layers, an unwrapped membrane sheet may be 2'×65', with slits cut every 12", following the pattern shown in FIG. 5. As another example, an 18"×18"×12" core with 120 membrane layers may be formed with a 3'×90' unwrapped membrane sheet, with slits formed every 18", following the pattern shown in FIG. 5.

Figure 6:
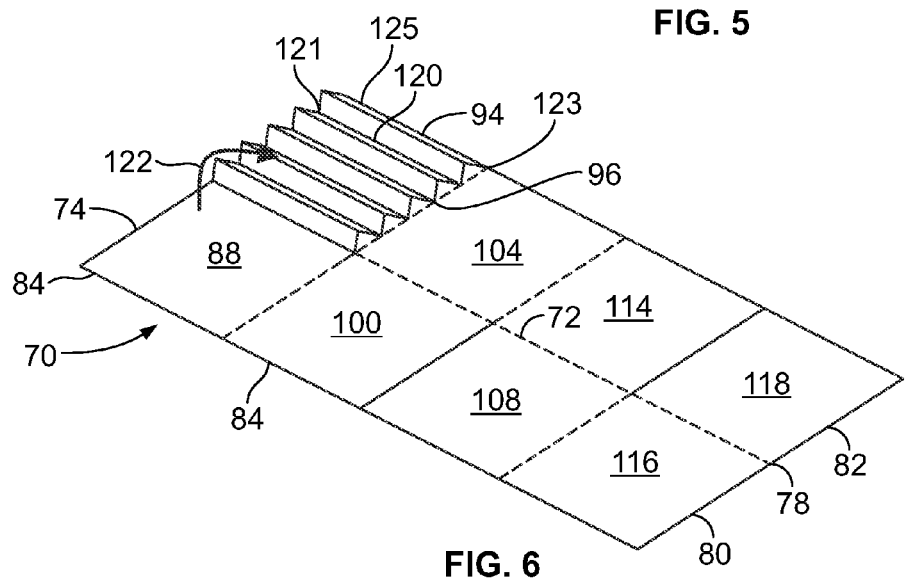
FIG. 6 illustrates a top perspective view of a first spacer positioned on a forming area of an unwrapped membrane sheet, according to an embodiment of the present disclosure.

FIG. 6 illustrates a top perspective view of a first spacer 120 positioned on the forming area 96 (as denoted by [96] under the first spacer 120) of the unwrapped membrane sheet 70, according to an embodiment of the present disclosure. As shown, each forming area may be sized and shaped to allow a spacer to be positioned thereon. Initially, the first spacer 120 may be positioned on the forming area 96 that is at the upper right corner of the unwrapped membrane sheet 70. The lateral edge 84 may then be pulled up and over in the direction of arc 122 about the longitudinal fold line 72 so that the spacer 120 is sandwiched between the forming area 96 and the forming area 88. The portion of lateral edge 84 abutting the outer lateral surface 125 of the spacer 120 may then be sealed thereto, such as through adhesives, tape, ultrasonic welding, heating sealing, or the like.

Notably, the an inlet (or outlet) end 121 of the first spacer 120 is positioned at the end edge 74, while an outlet (or inlet) end 123 of the first spacer 120 is positioned next to the slit 90. In this manner, when the membrane sheet 70 is wrapped, openings are formed at the inlet and outlet ends 121 and 123, such that the material of the membrane sheet 70 does not block the inlet and outlet ends 121 and 123. Slits formed through the membrane sheet 70 may generally be formed to accommodate inlet and outlet ends of spacers.

Figure 7:
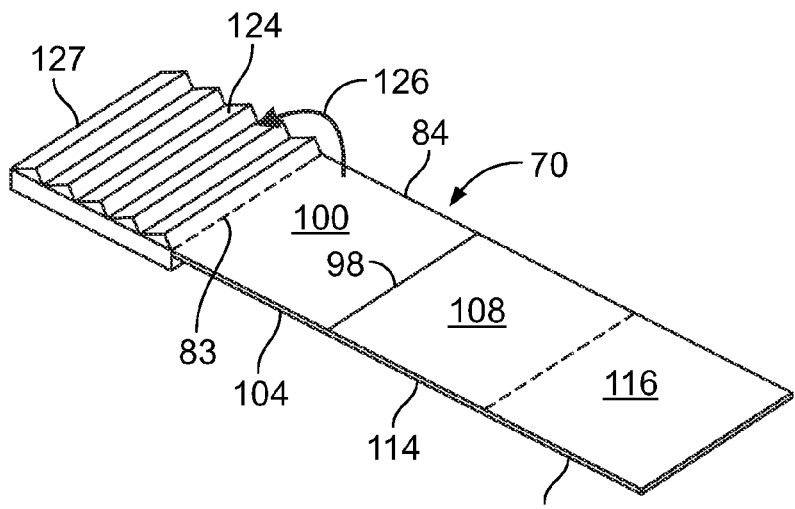
FIG. 7 illustrates a top perspective view of a second spacer positioned on a forming area of a folded membrane sheet, according to an embodiment of the present disclosure.

FIG. 7 illustrates a top perspective view of a second spacer 124 positioned on the forming area 88 (hidden by the second spacer 124) of the folded membrane sheet 70, according to an embodiment of the present disclosure. After the membrane sheet 70 has been folded over the first spacer 120 (shown in FIG. 6), as described above with respect to FIG. 6, a second spacer 124 is positioned on top of the forming area 88, thereby stacking over the first spacer 120. The second spacer 124 may be oriented in a perpendicular direction in relation to the first spacer 120. As such, the first and second spacers 120 and 124 may provide cross-flow levels in relation to one another. Alternatively, the first and second spacers 124 may be aligned parallel to one another (and slits formed in the membrane sheet 70 accordingly).

After the second spacer 124 is positioned as shown in FIG. 7, the membrane sheet 70 may be folded over the second spacer 124 in the direction of arc 126 about the fold line 83. As such, the forming area 100 covers the second spacer 124. The second spacer 124 is sandwiched between the forming area 88 and the forming area 100, and the forming area 104, which is folded onto the forming area 100, is exposed.

Figure 8:
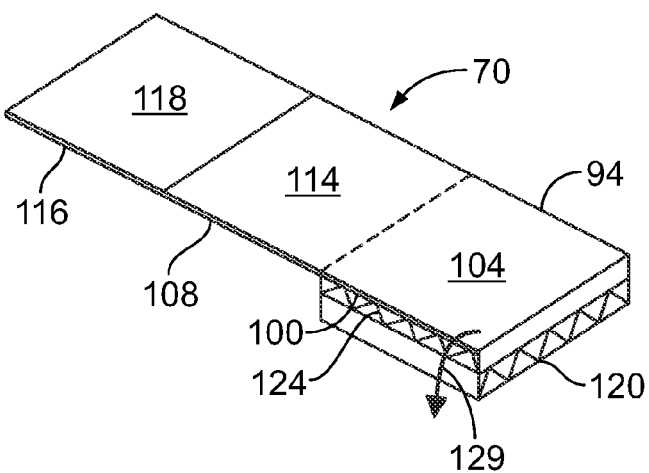
FIG. 8 illustrates a top perspective view of a forming area positioned over a second spacer, according to an embodiment of the present disclosure.

FIG. 8 illustrates a top perspective view of the forming area 104 positioned over the second spacer 124, according to an embodiment of the present disclosure. As noted above, the forming area 104 overlays the forming area 100. If the lateral edges 84 and 94 were not previously sealed together, membrane sheet 70 may be unfolded to expose the forming area 100 so that an additional spacer may be positioned thereon. For example, the unsecured portion of the membrane sheet 70 (for example, the portion of the membrane sheet 70 that is positioned above the second spacer 124, as shown in FIG. 8, and which is not sealed to or sandwiched between the spacers 120 and 124) may be unfolded about the longitudinal fold line 72 in the direction of arc 129, thereby exposing the forming area 100. If the lateral edges 84 and 94 are not sealed together after the folding stage described with respect to FIG. 6, and the unsealed portions of the membrane sheet 70 are unfolded to receive spacers, the resulting membranes may have a thickness equal to the thickness of the membrane sheet 70. If, however, the lateral edges 84 and 94 are sealed together after the folding stage described with respect to FIG. 6, the resulting membranes may have a thickness equal to twice the thickness of the membrane sheet 70.

Figure 9:
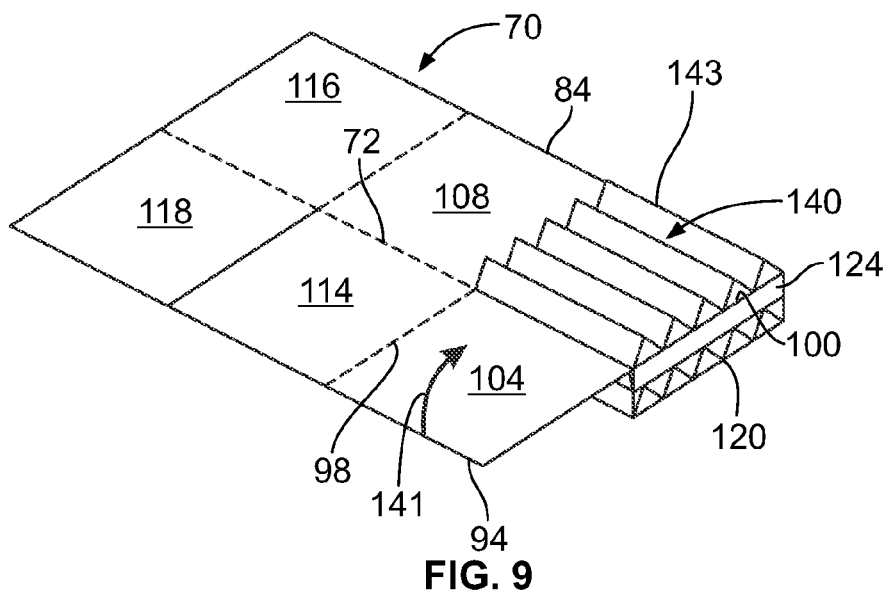
FIG. 9 illustrates a top perspective view of a third spacer positioned over a forming area, according to an embodiment of the present disclosure.

FIG. 9 illustrates a top perspective view of a third spacer 140 positioned over the forming area 100 (hidden by the third spacer 140), according to an embodiment of the present disclosure. As shown, the membrane sheet 70 is folded about the longitudinal fold line 72 in the direction of arc 141 so that the forming area 104 is positioned over a top surface of the third spacer 140. The lateral edge 94 of the forming area 104 may then be sealed to an outer lateral surface 143 of the third spacer 140.

Figure 10:
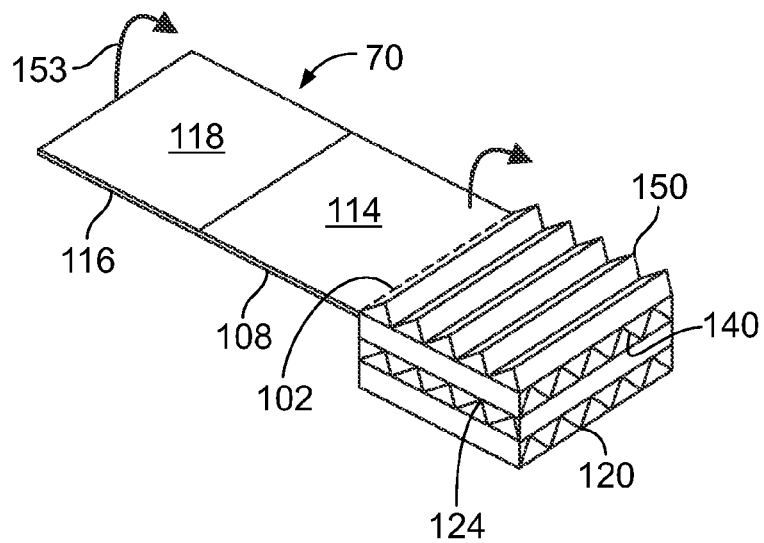
FIG. 10 illustrates a top perspective view of a fourth spacer positioned over a forming area, according to an embodiment of the present disclosure.

FIG. 10 illustrates a top perspective view of a fourth spacer 150 positioned over the forming area 104 (hidden from view by the fourth spacer 150), according to an embodiment of the present disclosure. As shown, the fourth spacer 150 may be oriented in a parallel relationship with the second spacer 124, which may be perpendicular to the orientation of both the first and third spacers 120 and 140. After the fourth spacer 150 is positioned on the forming area 104, the membrane sheet 70 is folded over in the direction of arc 153 about the fold line 102 so that the forming area 114 overlays a top surface of the fourth spacer 150.

Figure 11:
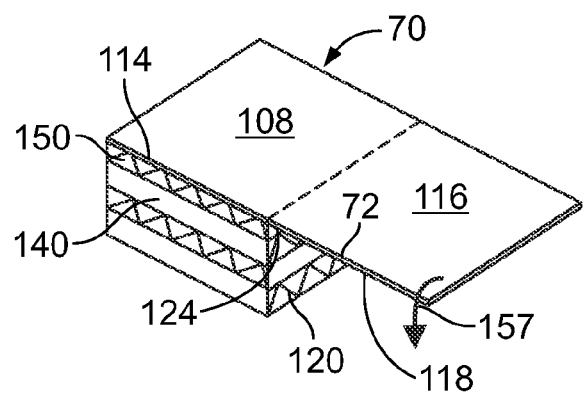
FIG. 11 illustrates a top perspective view of a forming area positioned over a fourth spacer, according to an embodiment of the present disclosure.

FIG. 11 illustrates a top perspective view of the forming area 108 positioned over the fourth spacer 150, according to an embodiment of the present disclosure. The forming area 108 may overlay the forming area 114. As such, the membrane sheet 70 may be unfolded in the direction of arc 157 about the longitudinal axis 72.

Figure 12:
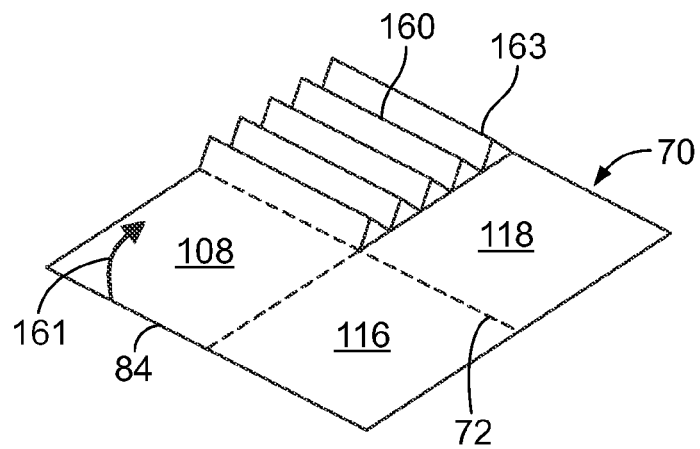
FIG. 12 illustrates a top perspective view of a fifth spacer positioned over a forming area, according to an embodiment of the present disclosure.

FIG. 12 illustrates a top perspective view of a fifth spacer 160 positioned over the forming area 114 (hidden from view by the fifth spacer 160), according to an embodiment of the present disclosure. The membrane sheet 70 is folded up and over in the direction of arc 161 about the longitudinal fold line 72 so that the forming area 108 overlays a top surface of the spacer 160. The lateral edge 84 may then be sealed to an outer lateral surface 163 of the fifth spacer 160.

Figure 13:
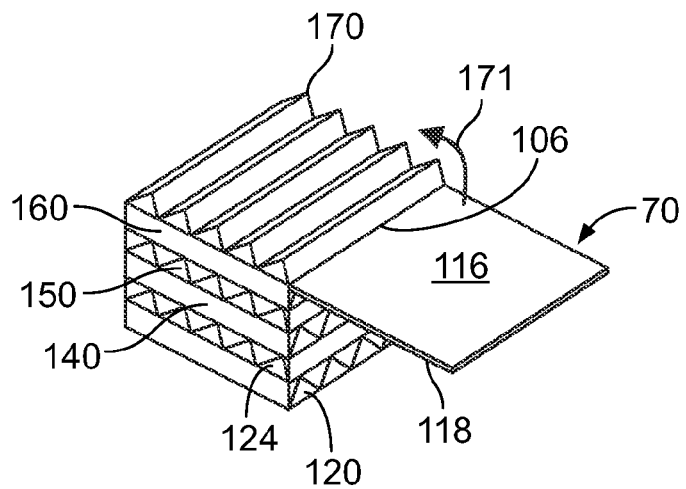
FIG. 13 illustrates a top perspective view of a sixth spacer positioned over a forming area, according to an embodiment of the present disclosure.

FIG. 13 illustrates a top perspective view of a sixth spacer 170 positioned over the forming area 108 (hidden from view by the sixth spacer 170), according to an embodiment of the present disclosure. The unsecured portion of the membrane sheet 70, including the forming areas 116 and 118, is then folded over the sixth spacer 170 in the direction of arc 171 about the fold line 106.

Figure 14:
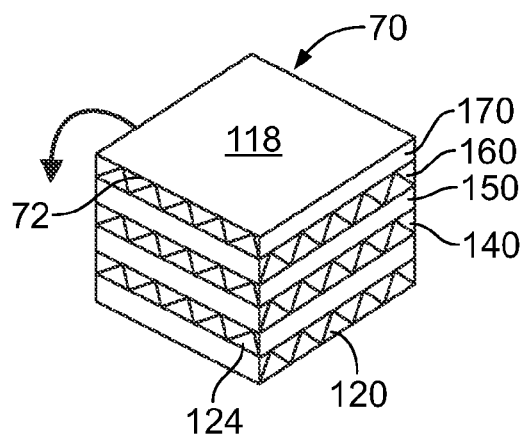
FIG. 14 illustrates a top perspective view of a forming area positioned over a sixth spacer, according to an embodiment of the present disclosure.

FIG. 14 illustrates a top perspective view of the forming area 118 positioned over the sixth spacer 170, according to an embodiment of the present disclosure. As shown, the forming area 118 overlays the forming area 116 (hidden from view by the forming area 118). Accordingly, the forming area 118 is unfolded from the forming area 116 about the longitudinal fold line 72.

Figure 15:
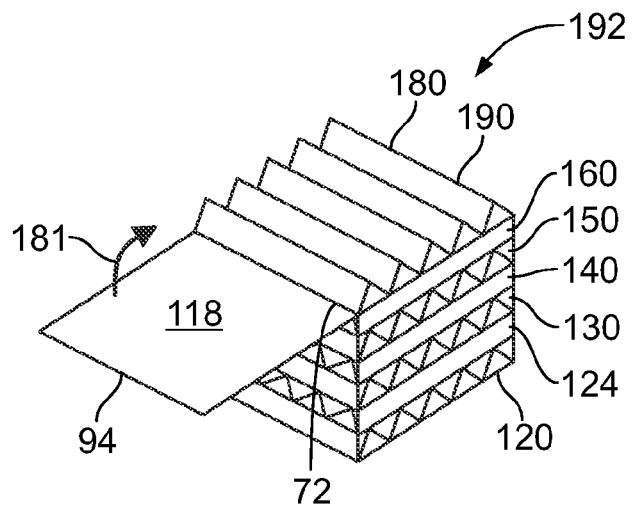
FIG. 15 illustrates a top perspective view of a seventh spacer positioned over a forming area, according to an embodiment of the present disclosure.

FIG. 15 illustrates a top perspective view of a seventh spacer 180 positioned over the forming area 116 (hidden from view by the seventh spacer 180), according to an embodiment of the present disclosure. The forming area 118 is then folded over the seventh spacer 180 about the central longitudinal fold line 72 in the direction of arc 181 and the lateral edge 94 is sealed to an outer lateral surface 190 of the seventh spacer 180 to complete the formed energy exchange assembly 192.

While shown with seven spacers, the membrane sheet 70 may be sized and shaped to provide an energy exchange assembly 192 having more or less spacers than shown. The process continues as described above with respect to additional spacers and forming areas. The energy exchange assembly 192 provides a plurality of fluid flow levels defined by the membranes and the spacers. Adjacent levels may be perpendicularly-oriented relative to one another (with respect to an X-Y axis, such as shown in FIG. 1) to form a cross-flow energy exchange pattern.

The energy exchange assembly 130 may be formed through a continuous wrapping or folding process, as described above. The membrane sheet 70 is folded about a desired number of spacers until a desired assembly height is reached.

Alternatively, all of the air spacers may be inserted into or onto the membrane sheet 70 before folding the membrane sheet 70 in half, as shown in FIG. 6. Then, one edge of the membrane sheet may be sealed to lateral surfaces of the spacers before folding begins. The wrapping may be simplified by inserting a spacer then folding the membrane sheet over to seal the edge. This process may then be repeated until the assembly reaches a desired height.

Figure 16:
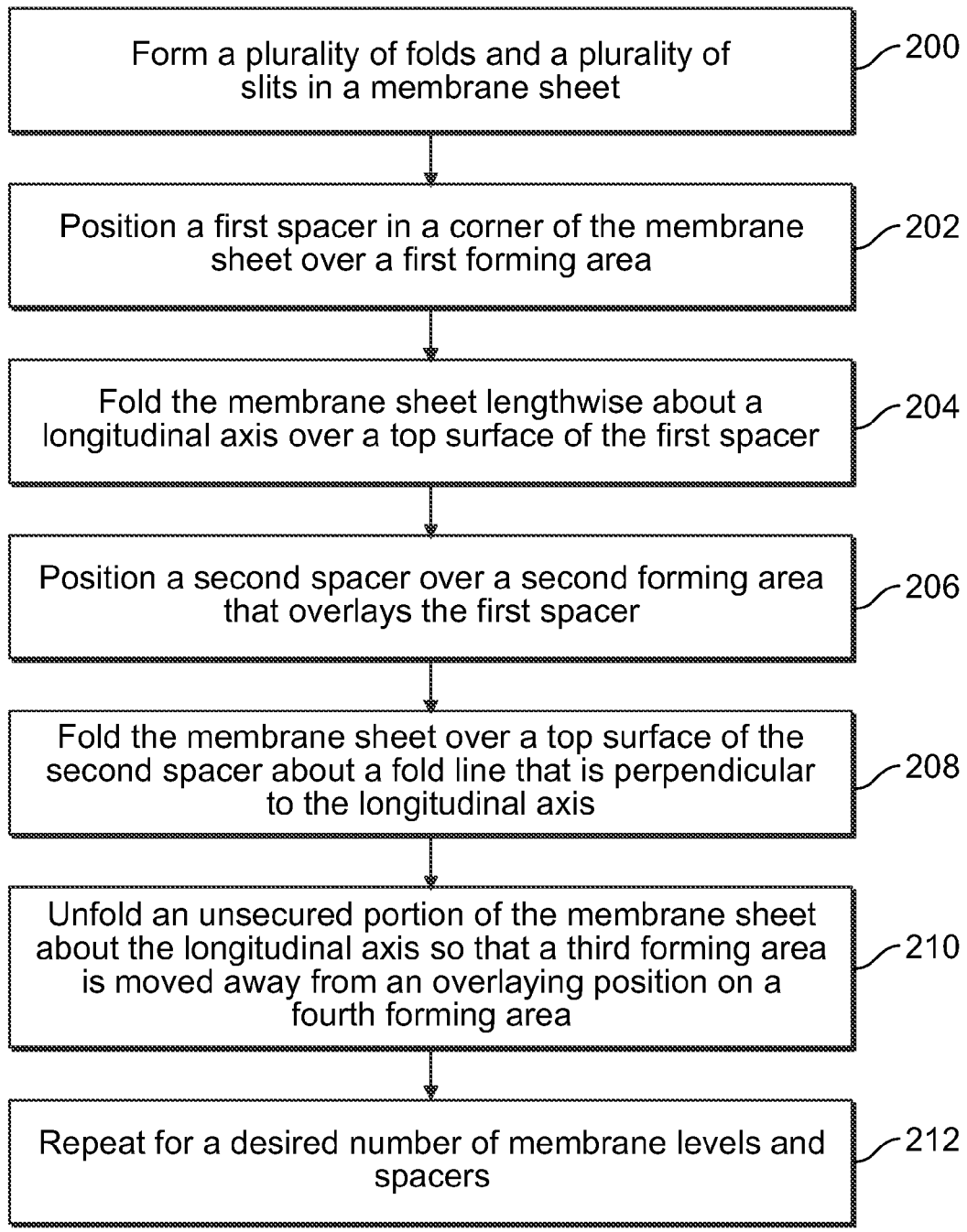
FIG. 16 illustrates a flow chart of a method of forming an energy exchange assembly, according to an embodiment of the present disclosure.

FIG. 16 illustrates a flow chart of a method of forming an energy exchange assembly, according to an embodiment of the present disclosure. At 200, a plurality of folds or creases and a plurality of slits are formed in a membrane sheet 70, such as shown in FIG. 5. Next, at 202, a first spacer is positioned in a corner of the membrane sheet. Referring to FIGS. 5 and 6, the first spacer 120 is positioned on and over the forming area 96, which may have an area at least as great as an axial cross-sectional area of the first spacer.

At 204, the membrane sheet 70 is folded lengthwise about the longitudinal axis 72 over a top surface of the first spacer 120. As such, the first spacer 120 is sandwiched between the forming area 96 and the forming area 88, with inlet and outlet ends 121 and 123 of the first spacer 120 being open such that each is not covered by the membrane sheet 70. A portion of the lateral edge 84 of the membrane sheet 70 may then be sealed to the lateral surface or wall 125 of the first spacer 120. Notably, the membrane sheet 70 is sealed to the lateral surface 125, but not above or below the first spacer 120. Accordingly, an energy transfer surface of the forming area 88 above the first spacer 120 may be devoid of any sealing material. In general, the membrane sheet 70 may be devoid of seams and/or sealing agents on or within the energy transfer surfaces of the forming areas, which may be above and/or below spacers.

Next, at 206, the second spacer 124 is positioned over the forming area 88 of the membrane sheet 70 that overlays the first spacer 120. The second spacer 124 may be oriented in a direction that is perpendicular to the first spacer 120.

At 208, the membrane sheet 70 is folded over the second spacer 124 about the fold line 83 so that the forming area 100 overlays a top surface of the second spacer 124, while the forming area 104 overlays the forming area 100. Then, at 210, an unsecured portion of membrane sheet 70 may be unfolded about the longitudinal fold line 72 so that the forming area 104 is moved away from an overlaying position with respect to the forming area 100. As such, the forming area 100 is positioned on top of the second spacer 124, while the forming area 104 extends to a side of the forming area 100. An edge of the forming area 100, as defined by the slit 98, may be sealed to a lateral wall 127 of the second spacer 127. At 212, the process repeats for a desired number of membrane levels and spacers.

Figure 17:
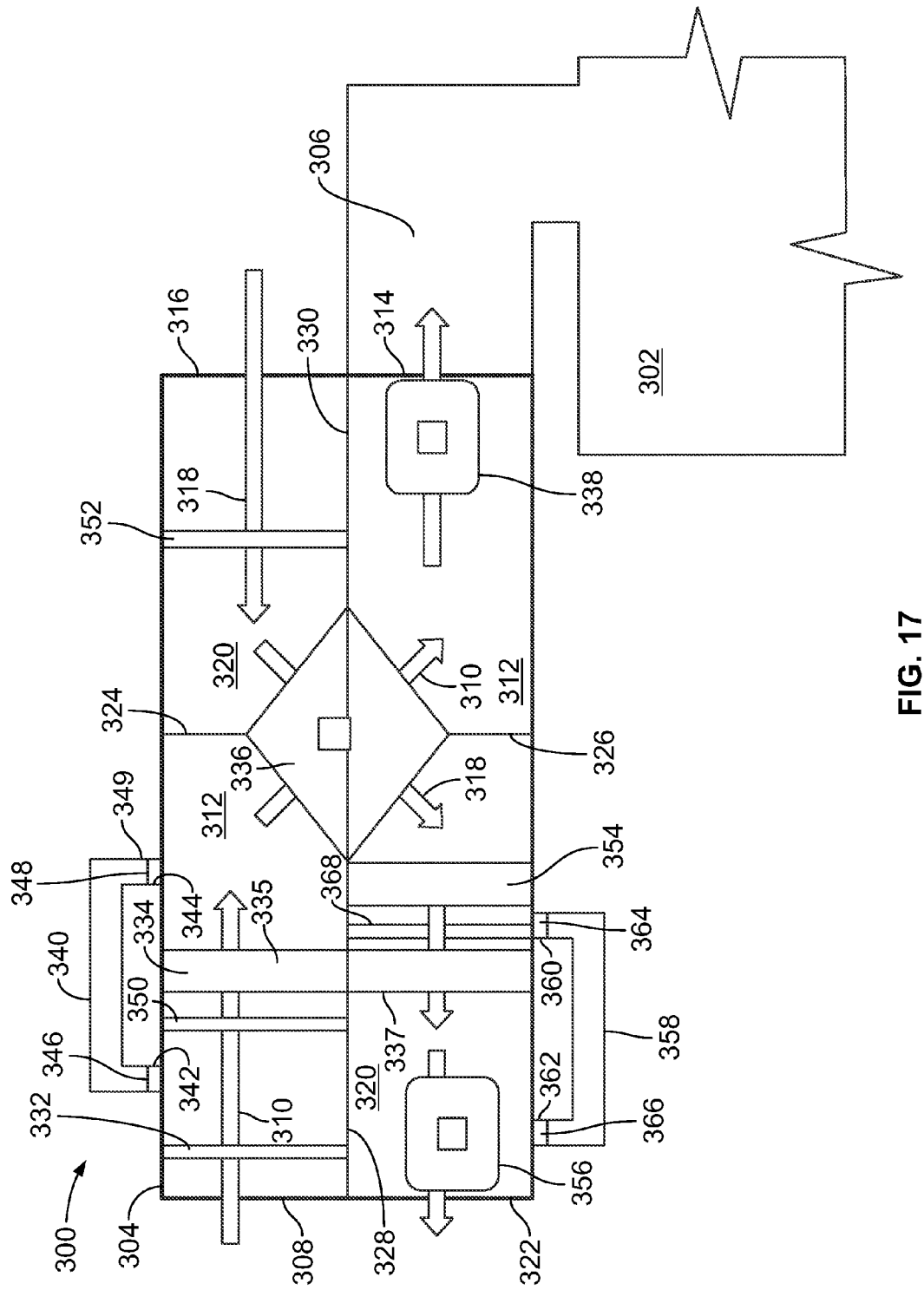
FIG. 17 illustrates a simplified schematic view of an energy exchange system operatively connected to an enclosed structure, according to an embodiment of the present disclosure.

FIG. 17 illustrates a simplified schematic view of an energy exchange system 300 operatively connected to an enclosed structure 302, according to an embodiment of the present disclosure. The energy exchange system 300 may include a housing 304, such as a self-contained module or unit that may be mobile (for example, the housing 304 may be moved among a plurality of enclosed structures), operatively connected to the enclosed structure 302, such as through a connection line 306, such as a duct, tube, pipe, conduit, plenum, or the like. The housing 304 may be configured to be removably connected to the enclosed structure 302. Alternatively, the housing 304 may be permanently secured to the enclosed structure 302. As an example, the housing 304 may be mounted to a roof, outer wall, or the like, of the enclosed structure 302. The enclosed structure 302 may be a room of a building, a commodities storage structure, or the like.

The housing 304 includes a supply air inlet 308 that connects to a supply air flow path 310. The supply air flow path 310 may be formed by ducts, conduits, plenum, channels, tubes, or the like, which may be formed by metal and/or plastic walls. The supply air flow path 310 is configured to deliver supply air 312 to the enclosed structure 302 through a supply air outlet 314 that connects to the connection line 306.

The housing 304 also includes a regeneration air inlet 316 that connects to a regeneration air flow path 318. The regeneration air flow path 318 may be formed by ducts, conduits, plenum, tubes, or the like, which may be formed by metal and/or plastic walls. The regeneration air flow path 318 is configured to channel regeneration air 320 received from the atmosphere (for example, outside air) back to the atmosphere through an exhaust air outlet 322.

As shown in FIG. 17, the supply air inlet 308 and the regeneration air inlet 316 may be longitudinally aligned. For example, the supply air inlet 308 and the regeneration air inlet 316 may be at opposite ends of a linear column or row of ductwork. A separating wall 324 may separate the supply air flow path 310 from the regeneration air flow path 318 within the column or row. Similarly, the supply air outlet 314 and the exhaust air outlet 322 may be longitudinally aligned. For example, the supply air outlet 314 and the exhaust air outlet 322 may be at opposite ends of a linear column or row of ductwork. A separating wall 326 may separate the supply air flow path 310 from the regeneration air flow path 318 within the column or row.

The supply air inlet 308 may be positioned above the exhaust air outlet 322, and the supply air flow path 310 may be separated from the regeneration air flow path 318 by a partition 328. Similarly, the regeneration air inlet 316 may be positioned above the supply air outlet 314, and the supply air flow path 310 may be separated from the regeneration air flow path 318 by a partition 330. Thus, the supply air flow path 310 and the regeneration air flow path 318 may cross one another proximate to a center of the housing 304. While the supply air inlet 308 may be at the top and left of the housing 304 (as shown in FIG. 17), the supply air outlet 314 may be at the bottom and right of the housing 304 (as shown in FIG. 17). Further, while the regeneration air inlet 316 may be at the top and right of the housing 304 (as shown in FIG. 17), the exhaust air outlet 322 may be at the bottom and left of the housing 304 (as shown in FIG. 17).

Alternatively, the supply air flow path 310 and the regeneration air flow path 318 may be inverted and/or otherwise re-positioned. For example, the exhaust air outlet 322 may be positioned above the supply air inlet 308. Additionally, alternatively, the supply air flow path 310 and the regeneration air flow path 318 may be separated from one another by more than the separating walls 324 and 326 and the partitions 328 and 330 within the housing 304. For example, spaces, which may contain insulation, may also be positioned between segments of the supply air flow path 310 and the regeneration air flow path 318. Also, alternatively, the supply air flow path 310 and the regeneration air flow path 318 may simply be straight, linear segments that do not cross one another. Further, instead of being stacked, the housing 304 may be shifted 90 degrees about a longitudinal axis aligned with the partitions 328 and 330, such that that supply air flow path 310 and the regeneration air flow path 318 are side-by-side, instead of one on top of another.

An air filter 332 may be disposed within the supply air flow path 310 proximate to the supply air inlet 308. The air filter 332 may be a standard HVAC filter configured to filter contaminants from the supply air 312. Alternatively, the energy exchange system 300 may not include the air filter 332.

An energy transfer device 334 may be positioned within the supply air flow path 310 downstream from the supply air inlet 308. The energy transfer device 334 may span between the supply air flow path 310 and the regeneration air flow path 318. For example, a supply portion or side 335 of the energy transfer device 334 may be within the supply air flow path 310, while a regenerating portion or side 337 of the energy transfer device 334 may be within the regeneration air flow path 318. The energy transfer device 334 may be a desiccant wheel, for example. However, the energy transfer device 334 may be various other systems and assemblies, such as including liquid-to-air membrane energy exchangers (LAMEEs), as described below.

An energy exchange assembly 336, which may be formed as described above with respect to FIGS. 5-16, is disposed within the supply air flow path 310 downstream from the energy transfer device 334. The energy exchange assembly 336 may be positioned at the junction of the separating walls 324, 326 and the partitions 328, 330. The energy exchange assembly 336 may be positioned within both the supply air flow path 310 and the regeneration air flow path 318. As such, the energy exchange assembly 336 is configured to transfer energy between the supply air 312 and the regeneration air 320.

One or more fans 338 may be positioned within the supply air flow path 310 downstream from the energy exchange assembly 336. The fan(s) 338 is configured to move the supply air 312 from the supply air inlet 308 and out through the supply air outlet 314 (and ultimately into the enclosed structure 302). Alternatively, the fan(s) 338 may be located at various other areas of the supply air flow path 310, such as proximate to the supply air inlet 308. Also, alternatively, the energy exchange system 300 may not include the fan(s).

The energy exchange system 300 may also include a bypass duct 340 having an inlet end 342 upstream from the energy transfer device 334 within the supply air flow path 310. The inlet end 342 connects to an outlet end 344 that is downstream from the energy transfer device 334 within the supply air flow path 310. An inlet damper 346 may be positioned at the inlet end 342, while an outlet damper 348 may be positioned at the outlet end 344. The dampers 346 and 348 may be actuated between open and closed positions to provide a bypass line for the supply air 312 to bypass around the energy transfer device 334. Further, a damper 350 may be disposed within the supply air flow path 310 downstream from the inlet end 342 and upstream from the energy transfer device 334. The damper 350 may be closed in order to allow the supply air 312 to flow into the bypass duct 340 around the energy transfer device 334. The dampers 346, 348, and 350 may be modulated between fully-open and fully-closed positions to allow a portion of the supply air 312 to pass through the energy transfer device 334 and a remaining portion of the supply air 312 to bypass the energy transfer device 334. As such, the bypass dampers 346, 348, and 350 may be operated to control the temperature and humidity of the supply air 312 as it is delivered to the enclosed structure 302. Examples of bypass ducts and dampers are further described in U.S. patent application Ser. No. 13/426,793, entitled "System and Method For Conditioning Air In An Enclosed Structure," which was filed Mar. 22, 2012, and is hereby incorporated by reference in its entirety. Alternatively, the energy exchange system 300 may not include the bypass duct 340 and dampers 346, 348, and 350.

As shown in FIG. 17, the supply air 312 enters the supply air flow path 310 through the supply air inlet 308. The supply air 312 is then channeled through the energy transfer device 334, which pre-conditions the supply air 312. After passing through the energy transfer device 334, the supply air 312 is pre-conditioned and passes through the energy exchange assembly 336, which conditions the pre-conditioned supply air 312. The fan(s) 338 may then move the supply air 312, which has been conditioned by the energy exchange assembly 336, through the energy exchange assembly 336 and into the enclosed structure 302 through the supply air outlet 314.

With respect to the regeneration air flow path 318, an air filter 352 may be disposed within the regeneration air flow path 318 proximate to the regeneration air inlet 316. The air filter 352 may be a standard HVAC filter configured to filter contaminants from the regeneration air 320. Alternatively, the energy exchange system 300 may not include the air filter 352.

The energy exchange assembly 336 may be disposed within the regeneration air flow path 318 downstream from the air filter 352. The energy exchange assembly 336 may be positioned within both the supply air flow path 310 and the regeneration air flow path 318. As such, the energy exchange assembly 336 is configured to transfer sensible energy and latent energy between the regeneration air 320 and the supply air 312.

A heater 354 may be disposed within the regeneration air flow path 318 downstream from the energy exchange assembly 336. The heater 354 may be a natural gas, propane, or electric heater that is configured to heat the regeneration air 320 before it encounters the energy transfer device 334. Optionally, the energy exchange system 300 may not include the heater 354.

The energy transfer device 334 is positioned within the regeneration air flow path 318 downstream from the heater 354. As noted, the energy transfer device 334 may span between the regeneration air flow path 318 and the supply air flow path 310.

As shown in FIG. 17, the supply side 335 of the energy transfer device 334 is disposed within the supply air flow path 310 proximate to the supply air inlet 308, while the regeneration side 337 of the energy transfer device 334 is disposed within the regeneration air flow path 310 proximate to the exhaust air outlet 322. Accordingly, the supply air 312 encounters the supply side 335 as the supply air 312 enters the supply air flow path 310 from the outside, while the regeneration air 320 encounters the regeneration side 337 just before the regeneration air 320 is exhausted out of the regeneration air flow path 318 through the exhaust air outlet 322.

One or more fans 356 may be positioned within the regeneration air flow path 318 downstream from the energy transfer device 334. The fan(s) 356 is configured to move the regeneration air 320 from the regeneration air inlet 316 and out through the exhaust air outlet 322 (and ultimately into the atmosphere). Alternatively, the fan(s) 356 may be located at various other areas of the regeneration air flow path 318, such as proximate to the regeneration air inlet 316. Also, alternatively, the energy exchange system 300 may not include the fan(s).

The energy exchange system 300 may also include a bypass duct 358 having an inlet end 360 upstream from the energy transfer device 334 within the regeneration air flow path 318. The inlet end 360 connects to an outlet end 362 that is downstream from the energy transfer device 334 within the regeneration air flow path 318. An inlet damper 364 may be positioned at the inlet end 360, while an outlet damper 366 may be positioned at the outlet end 362. The dampers 364 and 366 may be actuated between open and closed positions to provide a bypass line for the regeneration air 320 to flow around the energy transfer device 334. Further, a damper 368 may be disposed within the regeneration air flow path 318 downstream from the heater 354 and upstream from the energy transfer device 334. The damper 368 may be closed in order to allow the regeneration air to bypass into the bypass duct 358 around the energy transfer device 334. The dampers 364, 366, and 368 may be modulated between fully-open and fully-closed positions to allow a portion of the regeneration air 320 to pass through the energy transfer device 334 and a remaining portion of the regeneration air 320 to bypass the energy transfer device 334. Alternatively, the energy exchange system 300 may not include the bypass duct 358 and dampers 364 and 166.

As shown in FIG. 17, the regeneration air 320 enters the regeneration air flow path 318 through the regeneration air inlet 316. The regeneration air 320 is then channeled through the energy exchange assembly 336. After passing through the energy exchange assembly 336, the regeneration air 320 passes through the heater 354, where it is heated, before encountering the energy transfer device 334. The fan(s) 356 may then move the regeneration air 320 through the energy transfer device 334 and into the atmosphere through the exhaust air outlet 322.

As described above, the energy exchange assembly 336, which may be formed according to any of the methods described above, may be used with respect to the energy exchange system 300. Optionally, the energy exchange assembly 336 may be used with various other systems that are configured to condition outside air and supply the conditioned air as supply air to an enclosed structure, for example. The energy exchange assembly 336 may be positioned within a supply air flow path, such as the path 310, and a regeneration or exhaust air flow path, such as the path 318, of a housing, such as the housing 304. The energy exchange system 300 may include only the energy exchange assembly 336 within the paths 310 and 318 of the housing 304, or may alternatively include any of the additional components shown and described with respect to FIG. 17.

Embodiments of the present disclosure provide a continuous wrapping method that is used to form an energy exchange assembly, such as an energy recovery core. The method may include forming slits in a membrane sheet according to a predefined pattern. The method may also include placing a spacer on top of a corner of the membrane sheet. The membrane sheet may then be folded over a top of the spacer. A crease or fold may be formed in the membrane sheet proximate to a first edge of the spacer. The membrane sheet may be sealed to a second edge of the spacer to form a stack. The second edge is opposite the first edge. The method may also include repeating the placing, folding, and sealing steps with at least one additional air spacer until a desired height of the stack is reached.

A continuous wrapping process may be used to assemble an energy exchange assembly, such as an energy recovery core. The wrapping process may use only one roll or sheet of membrane material. The process may use a wrapping technique that seals the membrane only on one edge of a core stack to reduce the amount of adhesives required and minimize the blocked membrane area within the energy recovery core.

The wrapping technique described above improves performance and reduces cost in forming and operating an energy exchange assembly. For example, the seams created by folding the membrane sheet around the spacers may be on the sides of the assembly rather than the area where heat and moisture transfer occurs. When the membrane is secured to the spacer edge, the amount of moisture transfer through the membrane is not reduced. In addition, the membrane may only be sealed on one side of each layer rather than two or more, which is common with traditional layer-by-layer stacking approaches. Furthermore, by wrapping the membrane around the spacer(s), tension may be applied to the membrane material, thereby reducing the amount of membrane bulge. Reduction of membrane bulge reduces pressure drop within the assembly. The wrapping process may use only one roll of membrane without wasting any membrane in the process. Also, the continuous wrapping may be automated which allows for quicker assembly times. For example, the membrane sheet may be secured around a roller, which is driven by a motor, for example. Automated positioning arms may then be operated and controlled to wrap the membrane sheet around the spacers, as described above.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method of forming an energy exchange assembly, the method comprising:
    forming a plurality of creases and a plurality of slits in a membrane sheet according to a predefined pattern;
    positioning a first spacer on top of a first forming area of the membrane sheet;
    folding the membrane sheet over a top of the first spacer so that a second forming area is positioned over the top of the first spacer;
    sealing a first portion of the first forming area to a first outer lateral wall of the first spacer; and
    positioning a second spacer on top of the second forming area, wherein the positioning the second spacer operation stacks the second spacer over the first spacer.

2. The method of claim 1, further comprising folding the membrane sheet over a top of the second spacer so that a third forming area is positioned over the second spacer.

3. The method of claim 2, wherein a fourth forming area is positioned over the third forming area.

4. The method of claim 3, further comprising unfolding the fourth forming area away from the third forming area.

5. The method of claim 4, further comprising sealing a second portion of the third forming area to a second outer lateral wall of the second spacer.

6. The method of claim 1, further comprising repeating the positioning, folding, and sealing operations with respect to additional spacers and additional forming areas.

7. The method of claim 1, wherein the sealing operation occurs only at the first outer lateral wall of the first spacer.

8. The method of claim 1, wherein the membrane sheet is devoid of a seam on or within an energy transfer surface.

9. The method of claim 1, wherein the membrane sheet is devoid of a sealing agent on or within an energy transfer surface.

10. The method of claim 1, wherein the membrane sheet is devoid of a seam above or below each of the first and second spacers.

11. The method of claim 1, wherein the membrane sheet is devoid of a sealing agent above or below each of the first and second spacers.

12. The method of claim 1, wherein the membrane sheet is a single roll of material.

13. An energy exchange assembly, comprising:
    a membrane sheet including a plurality of creases and a plurality of slits;
    a first spacer positioned on top of a first forming area of the membrane sheet, wherein the membrane sheet is folded over a top of the first spacer so that a second forming area is positioned over the top of the first spacer, wherein a first portion of the first forming area is sealed to a first outer lateral wall of the first spacer; and
    a second spacer positioned on top of the second forming area, wherein the second spacer is stacked over the first spacer.

14. The energy exchange assembly of claim 13, wherein the membrane sheet is folded so that a third forming area is positioned over a top of the second spacer.

15. The energy exchange assembly of claim 14, further comprising a fourth forming area positioned over the third forming area.

16. The energy exchange assembly of claim 13 wherein the membrane sheet is devoid of both a seam and a sealing agent on or within an energy transfer surface.

17. The energy exchange assembly of claim 13, wherein the membrane sheet is devoid of both a seam and a sealing agent above or below each of the first and second spacers.

18. The energy exchange assembly of claim 13, wherein the membrane sheet is a single roll of material.

19. An energy exchange system, comprising:
    a supply air flow path configured to channel supply air to an enclosed structure;
    a regeneration air flow path configured to channel regeneration air from the enclosed structure to an outside environment; and
    an energy exchange assembly disposed within the supply air flow path and the regeneration air flow path, wherein the energy exchange assembly comprises:
        a membrane sheet including a plurality of creases and a plurality of slits;
        a first spacer positioned on top of a first forming area of the membrane sheet, wherein the membrane sheet is folded over a top of the first spacer so that a second forming area is positioned over the top of the first spacer, wherein a first portion of the first forming area is sealed to a first outer lateral wall of the first spacer; and
        a second spacer positioned on top of the second forming area, wherein the second spacer is stacked over the first spacer.

20. The energy exchanger system of claim 19, wherein the membrane sheet is a single roll of material.

* * * * *